Jan. 26, 1971  E. BLANK  3,559,007
CAPACITOR WITH LOWER INDUCTANCE PER UNIT VOLUME
Filed March 18, 1968
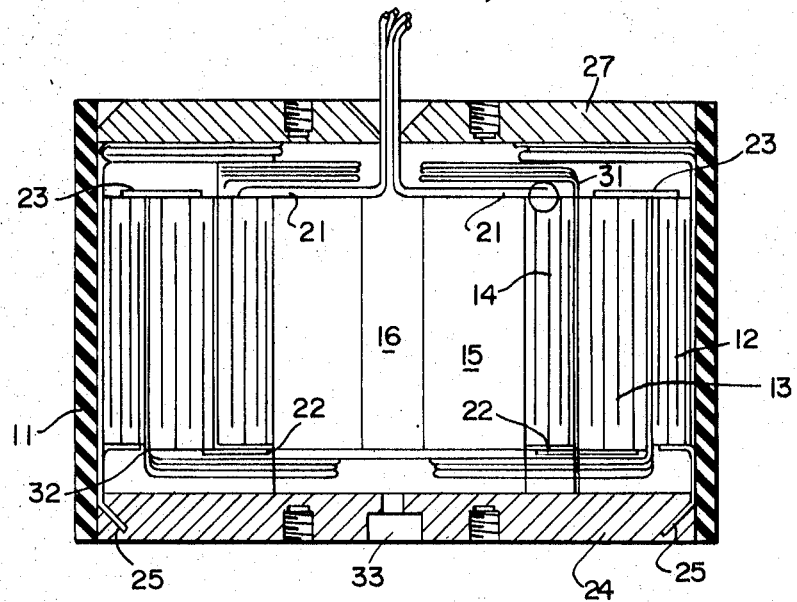
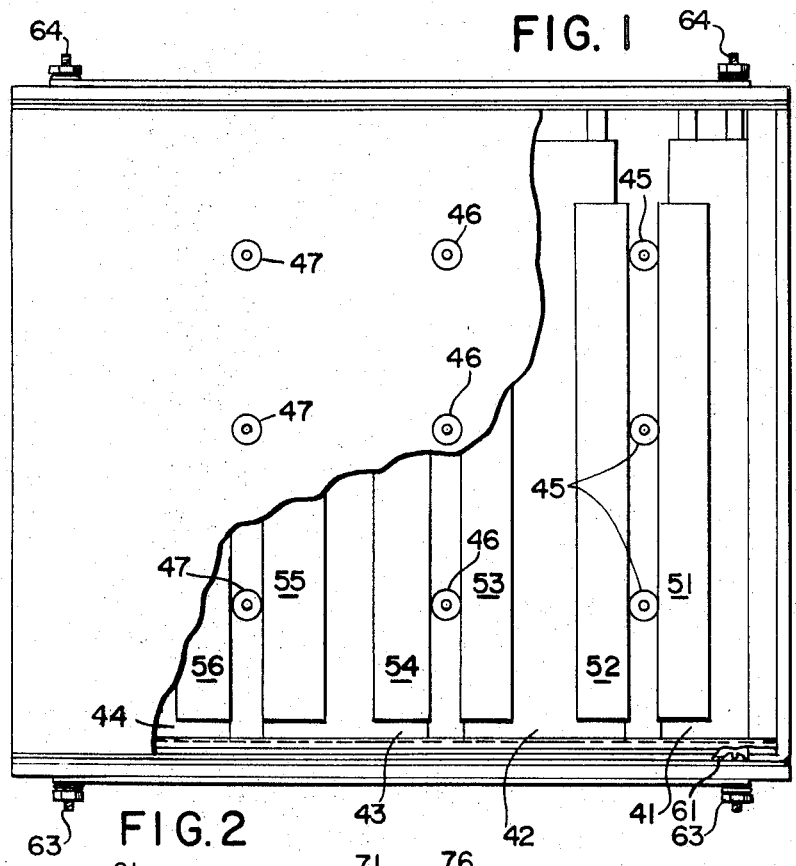
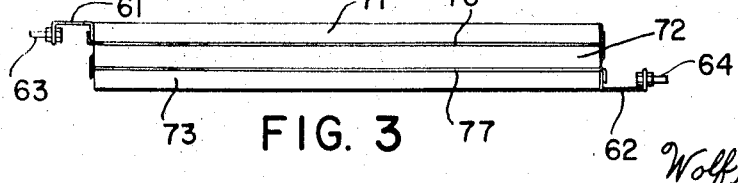
INVENTOR
EDWARD BLANK
BY
Wolf, Granfield & Hicken
ATTORNEYS

United States Patent Office 3,559,007
Patented Jan. 26, 1971

3,559,007
CAPACITOR WITH LOWER INDUCTANCE PER UNIT VOLUME
Edward Blank, Sharon, Mass., assignor to Tobe Deutschmann Laboratories, Inc., Canton, Mass., a corporation of Massachusetts
Filed Mar. 18, 1968, Ser. No. 713,696
Int. Cl. H01g 1/14, 3/17
U.S. Cl. 317—260                       14 Claims

ABSTRACT OF THE DISCLOSURE

A number of contiguous capacitor windings inside an enclosing casing are connected in series between a pair of terminals.

BACKGROUND OF THE INVENTION

The present invention relates in general to high energy capacitors and more particularly concerns a novel capacitor construction in which contiguous capacitor windings are connected in series to effect a reduction in inductance per unit volume and provide a relatively compact capacitor capable of producing a high energy impulse of short duration with structure that is rugged and relatively easy and inexpensive to fabricate.

It is an important object of this invention to provide a capacitor having a low inductance per unit volume.

It is another object of the invention to achieve the preceding object with a structure that is relatively compact and relatively easy and inexpensive to fabricate.

It is still a further object of the invention to achieve one or more of the preceding objects while providing a high energy capacitor capable of providing a high energy impulse of exceptionally short duration.

SUMMARY OF THE INVENTION

A plurality of contiguous capacitor windings are connected in series between a high terminal and a low terminal, the series connection between contiguous windings being at closely adjacent ends.

Numerous other features, objects and advantages of the invention will become apparent from the following specification when read in connection with the accompanying drawing in which:

BRIEF DESCRIPTION OF THE DRAWING

FIG. 1 is a longitudinal sectional view through a capacitor having coaxial banks of windings series connected according to the invention;

FIG. 2 is a top view of a capacitor having side-by-side banks of windings series connected according to the invention; and FIG. 3 is a side view of a bank of three windings.

DETAILED DESCRIPTION OF PREFERRED EMBODIMENTS

With reference now to the drawing and more particularly FIG. 1 threof, there is shown a longitudinal sectional view through a capacitor comprising coaxial windings connected in series according to the invention. This view best and fully illustrates the principles of this embodiment of the invention to those skilled in the art because of the coaxial geometry. A hollow cylindrical housing 11 of insulating material surrounds an outer coaxial capacitor winding 12, an intermediate capacitor winding 13 and an inner capacitor winding 14, all coaxial about a core 16. Each of windings 12–14 is of a known type having first and second conducting foils insulatedly separated with one of the foils being brought out at the top of the winding and the other of the foils being brought out at the bottom of the winding. Such an arrangement facilitates a convenient low inductance series connection between contiguous windings. Thus, windings 14 and 13 may be connected by conducting tabs such as 22 in the plane embracing the bottom ends of these windings, and windings 13 and 12 may be interconnected in the plane embracing the top ends of these windings by tabs, such as 23. The bottom of outer winding 12 may then be connected to aluminum base plate 24 by tabs, such as 25 soldered thereto. Tabs at the top of winding 14 may be brought out through leads 21 and connected to upper aluminum conducting plate 27. Cylindrical housing 11, base plate 24, upper plate 27 and core 16 comprise casing means defining an annular enclosed volume substantially filled with capacitor windings.

A cup-like insulating shell 31 separates inner winding 14 and intermediate winding 13. A similar cup-shaped insulating shell 32 separates intermediate winding 13 and outer winding 12. The insulating shells 31 and 32 comprise the insulating wrap of kraft paper or other suitable insulating material about windings 14 and 13, respectively. The wraps extend above winding 14 and below winding 13, respectively, and are then folded over as shown.

The tabs may be tinned copper swaged to the respective windings ³⁄₁₆″ x 3″ x 0.004″. It has been found that eight equiangularly spaced tabs (spaced 45° apart about the axis) are sufficient to insure a low inductance connection. It has also been found sufficient to use four of wires 21 swaged to the top of inner winding 14 at four equiangularly spaced points (90° apart), these wires being #18 AWG stranded wire, the void in upper plate 27 being filled with aluminum solder.

The resulting unit has a low impedance output, exceptionally low inductance per unit volume and stores high voltage energy for rapid discharge. In a typical example a 40 kilovolt capacitor has a core of 1¾″ inner diameter with an outer diameter of about 15″. A conventional capacitor gap wound, 9″ high with a ¾″ margin and five windings has a typical active width of 1″ using ⅝ of height and a 1½″ gap. In the new form according to the invention for the same height, the active width is of the order of 7½″.

What is believed to happen is that the axial flow of current in adjacent pairs of the windings is in opposite directions to produce an effect between base plate 24 and upper plate 27 that makes the effective inductance very low, especially when compared with a single continous winding filling the annular space between core 16 and shell 11.

Referring to FIG. 2, there is shown an embodiment of the invention in which the serpentine arrangement of windings according to the invention is carried out by arranging a bank of three windings, one on top of the other, connected in series, four of these banks being connected in parallel to provide high capacity, high voltage and low inductance per unit volume in a convenient flat case that encloses a volume substantially filled by the windings. Thus, the capacitor comprises four winding banks 41, 42, 43 and 44 separated by posts such as 45 between banks 41 and 42, posts 46 between windings 42 and 43, and posts 47 between banks 43 and 44. Respective insulators, such as 51–56, of U-shaped cross section abut the posts. One set of bank terminals may be connected to a conductor 61 while the other set of bank terminals are connected to a conductor 62. Conductor 61 may then be brought out through a screw terminal 63 while conductor 62 may be brought out through a screw terminal 64, the terminals 63 and 64 preferably being in different planes to facilitate stacking such capacitors. Thus, two capacitors could be oriented one on top of the other with the terminals 63 of one closely adjacent to the terminals 64 of the other and joined together. The remaining terminals 63 and 64 would then be separated from one another by nearly twice the height of the stack capacitors to minimize the chance of voltage breakdown between the terminals.

Although the arrangement of multiple banks to fill up such a large volume is advantageous from the standpoint of the ease with which a number of small windings may be fabricated, it is within the principles of the invention to fill the entire volume of the case with but three windings, one on top of the other. FIG. 2 represents a preferred embodiment of the flat form of the invention. The commercial embodiment is known as the ESC-347 available from the assignee of this application.

FIG. 3 is a side view of a bank of windings which typically could be any of banks 41, 42, 43 or 44. A bank may include an upper winding 71, an intermediate winding 72 and a lower winding 73. Upper winding 71 and intermediate winding 72 are connected in series at the right end 74. Intermediate winding 72 and lower winding 73 are interconnected at the left end 75. Conductor 61, typically a conducting foil of generally U-shaped cross section, connects the left end of upper winding 71 to terminal 63, and similar conductor 62 connects the right end of lower winding 73 to terminal 64 to complete the series connecteion of windings 71, 72 and 73 between terminals 63 and 64.

A thin insulating sheet 76 separates upper winding 71 from intermediate winding 72, and a similar thin insulating sheet 77 separates intermediate winding 72 from lower winding 73.

An important feature of the invention is the maintenance of a ratio of winding width to separation between windings that is very high, the ratio of winding width to winding thickness also being high. Thus, a typical winding width is six inches wide, about ½ inch thick and the separation between windings is only of the order of $\frac{1}{32}$ inch. With four banks side-by-side connected in parallel, the effective width is of the order of 24 inches to appreciably increase these ratios while facilitating manufacture of the individual windings.

To achieve minimum effective inductance with a high energy high voltage capacitor established by capacitor windings enclosed in a rectangular volume according to the invention, it is desirable to make this volume as wide as practical and as thin as practical.

It is believed that the low effective inductance achieved according to the invention may be explained from transmission line theory considerations. Individual pairs of windings may be thought of as plates of a parallel plate transmission line having respective equivalent oppositely oriented current sheets separated by a distance $d$ that is less than the thickness of a winding and of width $w$ that is of the order of the winding width. The characteristic impedance of such a transmission line is proportional to the ration $d/w$. Since the inductance per unit length is proportional to the characteristic impedance, lowering the characteristics impedance by minimizing the $d/w$ ratio is believed to be accompanied by a reduction in the effective inductance. In the case of windings in a rectangular volume, this result is accomplished by making the effective width of the winding large compared to the winding thickness and still larger compared to the separation between windings. In the case of windings in an annular volume this result is accomplished by connecting a number of windings in series in contiguous radial relationship wherein the circumference of each winding is much greater than its radial thickness and still greater than the separation between radial windings.

There has been described a novel high energy capacitor characterized by exceptionally low inductance per unit volume while being relatively inexpensive and easy to fabricate in a rugged structure. It is evident that those skilled in the art may now make numerous modifications of and departures from the specific embodiments described herein without departing from the inventive concepts. Consequently the invention is to be construed as embracing and every novel feature and novel combination of features present in or possessed by the apparatus and techniques herein disclosed and limited solely by the spirit and scope of the appended claims.

What is claimed is:

1. A capacitor comprising,
   an odd number at least three of capacitor winding means each comprising first and second insulatedly separated conducting foils with said first foil connected to a first conducting means at the first end of a winding means and said second foil connected to a second conducting means at the second end of the latter winding means,
   casing means defining an enclosed volume containing said at least three winding means in closely adjacent relationship with said first end of each winding means substantially in the same plane as said second end of an immediately adjacent winding means,
   means connecting said first conducting means of one of said winding means to said second conducting means of an immediately adjacent winding means to connect said winding means in series,
   first and second insulatedly separated generally parallel planar external terminal plates carried by said casing means extending across the top and bottom respectively of said casing means separated substantially by the length of said winding means,
   and means for connecting the series combination of said winding means in series with said first and second external terminal plates to provide a low inductance capacitor therebetween.
   said winding means separating said first and second external terminals.

2. A capacitor in accordance with claim 1 wherein said capacitor winding means substantially fill said enclosed volume.

3. A capacitor in accordance with claim 1 wherein said volume is annular and said winding means are coaxial.

4. A capacitor in accordance with claim 3 wherein said capacitor winding means substantially fill said enclosed volume.

5. A capacitor in accordance with claim 4 wherein said casing means comprises an insulating cylindrical shell closed at one end with a first conducting plate comprising said first terminal and closed at the other end with a second conducting plate comprising said second terminal,
   the diameter of each of said first and second conducting plates being slightly less than the outside diameter of said insulating cylindrical shell.

6. A capacitor in accordance with claim 4 and further comprising cup-shaped insulating shells separating adjacent ones of said windings with adjacent ones of said shells opening in opposite axial directions.

7. A capacitor in accordance with claim 5 and further comprising cup-shaped insulating shells separating adjacent ones of said windings with adjacent ones of said shells opening in opposite axial directions.

8. A capacitor in accordance with claim 1 wherein said enclosed volume is rectangular and said winding means are arranged one on top of the other to form at least one bank of winding means connected in series between and separating said first and second external terminal plates.

9. A capacitor in accordance with claim 8 wherein said winding means substantially fill said enclosed volume.

10. A capacitor in accordance with claim 9 wherein there are a plurality of said banks side-by-side in series between and separating said first and second external terminal plates.

11. A capacitor in accordance with claim 8 wherein there are a plurality of said banks side-by-side with said first terminal plate located in a plane generally parallel and close to one large bounding side of said enclosed volume and said second terminal plate located in a plane generally parallel and close to the other large bounding side of said volume and further comprising, means for connecting said banks in parallel between said first and second terminal plates.

12. A capacitor in accordance with claim 1 wherein the width of each of said winding means is many times greater than the separation between adjacent ones of said winding means and the thickness of each of said winding means, the winding thickness being greater than said separation.

13. A capacitor in accordance with claim 3 wherein the effective width of each of said winding means is large compared to the thickness thereof and still larger compared to the separation between adjacent winding means, whereby the circumference of each of said winding means is much greater than the radial thickness thereof and still greater than the separation between adjacent radially displaced windings.

14. A capacitor in accordance with claim 8 wherein the effective width of each of said winding means is large compared to the thickness thereof and still larger compared to the separation between adjacent windings.

References Cited

UNITED STATES PATENTS

| | | | |
|---|---|---|---|
| 2,039,340 | 5/1936 | Olving | 317—260 |
| 3,097,330 | 7/1963 | Fischer | 317—260X |
| 3,300,695 | 1/1967 | Cypra | 317—260 |
| 3,302,082 | 1/1967 | Preissinger | 317—260 |
| 3,214,658 | 10/1965 | Linson | 317—259 |
| 3,377,530 | 4/1968 | Meyers | 317—242 |

FOREIGN PATENTS

| | | | |
|---|---|---|---|
| 743,350 | 11/1943 | Germany | 317—260 |

ELLIOT A. GOLDBERG, Primary Examiner

U.S. Cl. X.R.

317—242, 261